US009919736B2

United States Patent
Yanez

(10) Patent No.: US 9,919,736 B2
(45) Date of Patent: Mar. 20, 2018

(54) VEHICLE ADAPTIVE STEERING CONTROL APPARATUS

(71) Applicant: Nissan North America, Inc., Franklin, TN (US)

(72) Inventor: Andre Yanez, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 93 days.

(21) Appl. No.: 15/085,547

(22) Filed: Mar. 30, 2016

(65) Prior Publication Data

US 2017/0282971 A1  Oct. 5, 2017

(51) Int. Cl.
| | |
|---|---|
| *B62D 6/02* | (2006.01) |
| *B62D 6/00* | (2006.01) |
| *B62D 5/00* | (2006.01) |
| *B62D 5/04* | (2006.01) |
| *B62D 17/00* | (2006.01) |
| *B62D 5/06* | (2006.01) |

(52) U.S. Cl.
CPC ............ *B62D 6/002* (2013.01); *B62D 5/001* (2013.01); *B62D 5/0421* (2013.01); *B62D 5/06* (2013.01); *B62D 17/00* (2013.01)

(58) Field of Classification Search
CPC .......... B62D 6/002; B62D 5/001; B62D 5/06; B62D 17/00
See application file for complete search history.

(56) References Cited

U.S. PATENT DOCUMENTS

| | | | | | |
|---|---|---|---|---|---|
| 5,899,292 | A | * | 5/1999 | Paul .................. | B60K 17/30 180/403 |
| 6,728,615 | B1 | * | 4/2004 | Yao .................... | B62D 6/008 180/402 |
| 7,308,964 | B2 | * | 12/2007 | Hara .................. | B62D 1/163 180/402 |
| 2009/0177348 | A1 | | 7/2009 | Yanagi | |

(Continued)

OTHER PUBLICATIONS

Thomas D. Gillespie, Fundamentals of Vehicle Dynamics, book, 1992, Chapter 8, Society of Automotive Engineers, Inc., Warrendale, PA, U.S.A.

*Primary Examiner* — Jacob D Knutson
*Assistant Examiner* — Marlon A Arce
(74) *Attorney, Agent, or Firm* — Global IP Counselors, LLP

(57) ABSTRACT

A vehicle adaptive steering control apparatus includes a front wheel steering mechanism having a right wheel steering portion and a left wheel steering portion. A left front wheel rotatably is coupled to the left wheel steering portion. A right front wheel rotatably coupled to the right wheel steering portion. A controller in electronic communication with a steer-by-wire steering wheel assembly and the front wheel steering mechanism operates the front wheel steering mechanism to turn the left front wheel and the right front wheel in accordance with Ackerman steering geometry. The controller is also configured to calculate toe angle adjustments for the right wheel steering portion relative to the left wheel steering portion and make the toe angle adjustments to right wheel steering portion and the left wheel steering portion during turning and steering movements effected by the right wheel steering portion and the left wheel steering portion.

3 Claims, 9 Drawing Sheets

(56) References Cited

U.S. PATENT DOCUMENTS

| | | |
|---|---|---|
| 2014/0239603 A1 | 8/2014 | Balandin |
| 2015/0012183 A1 | 1/2015 | Sugai |
| 2015/0274206 A1 | 10/2015 | Takeda |
| 2015/0291210 A1 | 10/2015 | Kageyama |
| 2015/0321692 A1 | 11/2015 | Kuramochi |

* cited by examiner

VEHICLE ADAPTIVE STEERING CONTROL APPARATUS

BACKGROUND

Field of the Invention

The present invention generally relates to a vehicle adaptive steering control apparatus. More specifically, the present invention relates to an adaptive steering control apparatus that continuously independently adjusts the steering angle of each of the steerable wheels of a vehicle.

Background Information

The text FUNDAMENTALS OF VEHICLE DYNAMICS by Thomas D. Gillespie (hereinafter the "Gillespie text") describes various steering assemblies and the geometry that is used to configure and design such steering assemblies. For example, the Gillespie text describes rack and pinion steering linkages, steering gearbox linkages and truck steering systems and the basic geometry used to design each system. The fundamentals set forth in the Gillespie text are hereinafter referred to as "Ackermann steering geometry". Ackermann steering geometry balances a number of inter-related issues and is typically employed in systems where steerable wheels in the vehicle (usually the front wheels) are mechanically linked together such that the steerable wheels are moved together simultaneously during turning and steering movements. Ackermann steering geometry assumes that when the vehicle is moving approximately in a straight trajectory, the steerable wheels are provided what is referred to as "toe-in" angles, where the two front tires are not absolutely parallel to one another at a stop, but are angled slight toward one another aiming at a point far ahead of the vehicle. The "toe-in" angle is provided because at highway speeds, the forces acting on the front wheels tends to push forward portions of the vehicle away from one another. The "toe-in" angle compensates for the outward movement of the front wheels. During turning operations, a toe angle (relative turning radius between two steerable wheels) continually changes, depending upon the overall degree of the turn of the vehicle, as is explained in the Gillespie text.

Consequently, the Ackermann steering geometry based steering system is configured such that during a right turn, the right front wheel is turned to the right with a greater angular displacement than the left front wheel. Similarly, during a left turn, the left front wheel is turned to the left with greater angular displacement than the right front wheel.

Ackerman steering geometry based steering systems do not necessarily take into account additional forces acting on the steerable wheels during a turning operation. For example, during a cornering operation, forces (for example, centrifugal forces) acting on the outboard wheel (the left wheel in a right turn, the right wheel in a left turn) differ from the forces acting on the inboard wheel (the left wheel in a left turn, the right wheel in a right turn). Conventional Ackermann steering geometry based steering mechanisms have no means for making adjustments in the movements of the steerable wheels in response to increased forces acting on the steerable wheels during a turning operation.

SUMMARY

One object of the present disclosure is to provide a vehicle with steerable wheels that are independently controlled with constant re-adjustment of the toe angle between the steerable wheels in order to reduce tire slippage, reduce tire wear and optimize driving performance.

Another object of the present disclosure is to constant re-adjustment the toe angle between pairs of steerable wheels in order to increase cornering performance (optimize and/or reduce tire slip), improve braking operations, in particular during braking operations where the ABS (Anti-Lock Braking System) manipulates individual wheel braking mechanisms and improve drive-ability during VDC (Vehicle Dynamic Control) corrections and operations.

In view of the state of the known technology, one aspect of the present disclosure is to provide a vehicle with an adaptive steering control apparatus that includes a steer-by-wire steering wheel assembly, a front wheel steering mechanism and a controller. The front wheel steering mechanism is in electronic communication with the steer-by-wire steering wheel assembly. The front wheel steering mechanism has a right wheel steering portion and a left wheel steering portion. A left front wheel is rotatably coupled to the left wheel steering portion and a right front wheel is rotatably coupled to the right wheel steering portion. The controller is in electronic communication with the steer-by-wire steering wheel assembly and the front wheel steering mechanism. The controller is configured to operate the front wheel steering mechanism to turn the left front wheel and the right front wheel in accordance with Ackerman steering geometry. The controller is also configured to calculate toe angle adjustments for the right wheel steering portion relative to the left wheel steering portion and make the toe angle adjustments to right wheel steering portion and the left wheel steering portion during turning and steering movements effected by the right wheel steering portion and the left wheel steering portion.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
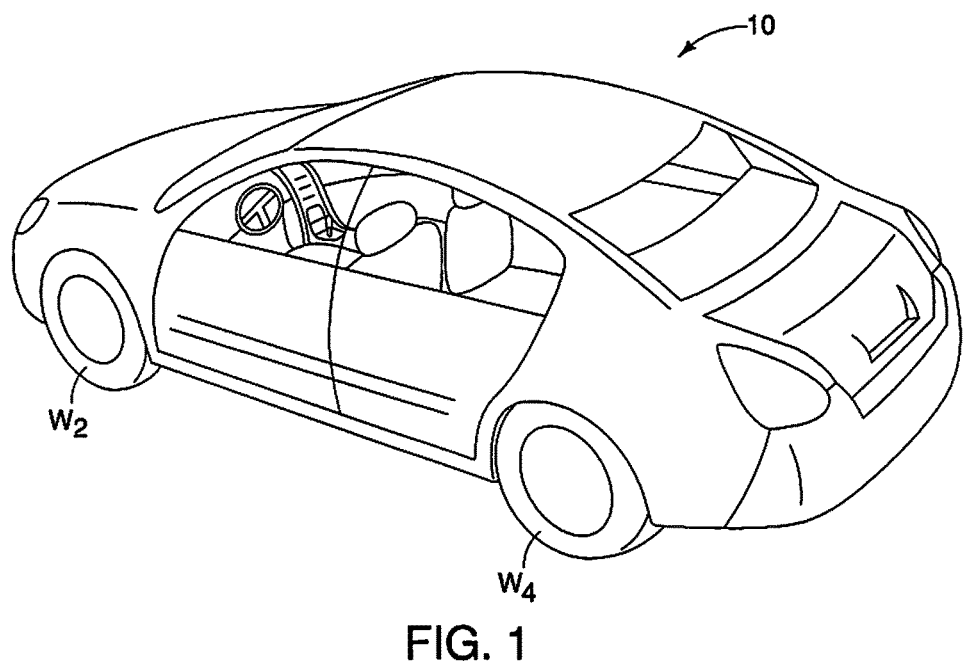
FIG. 1 is a perspective view of a vehicle having an adaptive steering control apparatus in accordance with a first embodiment.

Referring initially to FIG. 1, a vehicle 10 is illustrated in accordance with a first embodiment. The vehicle 10 includes an adaptive steering control apparatus 12 (FIG. 2) configured to independently adjust the steering angles for each of four wheels $W_1$, $W_2$, $W_3$ and $W_4$ of the vehicle 10, during steering and turning operations in a manner described in greater detail below.

Figure 2:
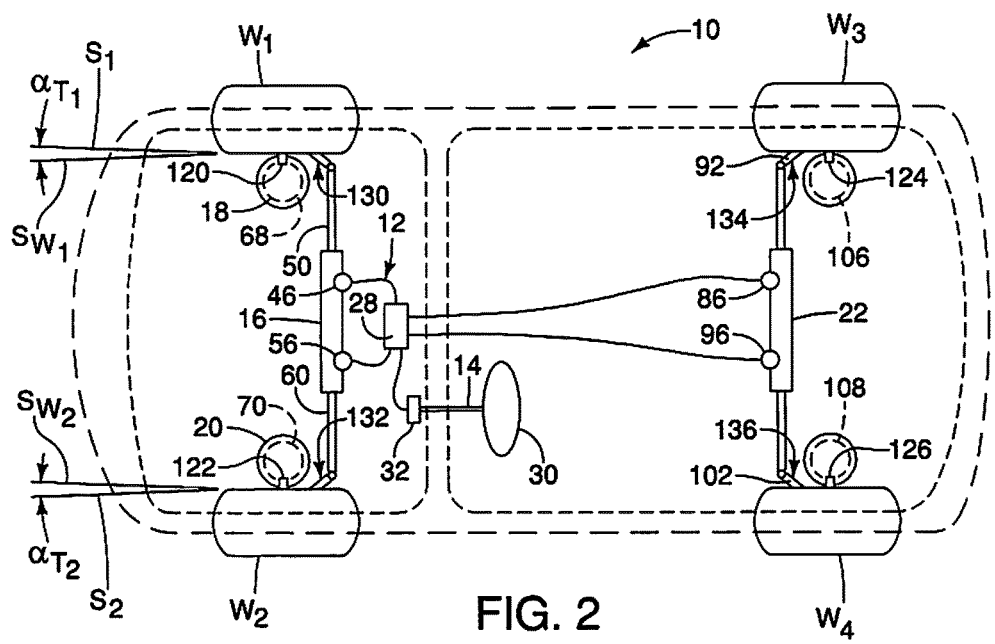
FIG. 2 is a schematic view of the vehicle showing various portions of the adaptive steering control apparatus including four steerable wheels, a steer-by-wire steering wheel assembly, a front wheel steering mechanism, a right front suspension structure, a left front suspension structure, a rear wheel steering mechanism, a right rear suspension structure, a left rear suspension structure and a controller in accordance with the first embodiment.
Figure 3:
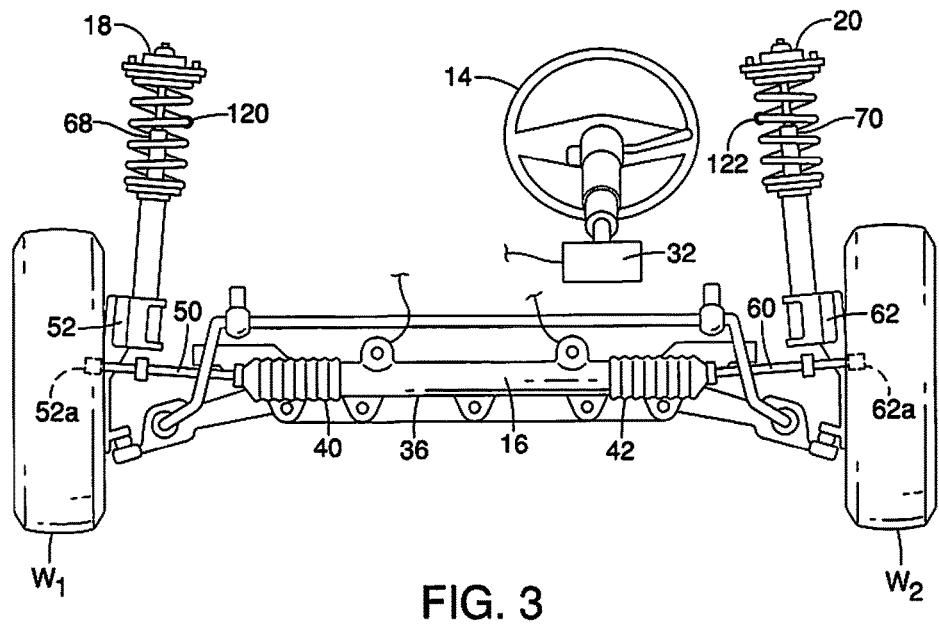
FIG. 3 is a front view of portions of the adaptive steering control apparatus including the front two steerable wheels, the steer-by-wire steering wheel assembly, the front wheel steering mechanism, the right front suspension structure and the left front suspension structure in accordance with the first embodiment.

As shown in FIGS. 2 and 3, The adaptive steering control apparatus 12 includes the wheels $W_1$, $W_2$, $W_3$ and $W_4$, a steer-by-wire steering wheel assembly 14, a front wheel steering mechanism 16, a right front suspension structure 18, a left front suspension structure 20, a rear wheel steering mechanism 22, a right rear suspension structure 24, a left rear suspension structure 26 and a controller 28.

The steer-by-wire steering wheel assembly 14 (also referred to as a drive-by-wire assembly) includes a steering wheel 30 and a sensor 32 that detects turning motion of the steering wheel 14. The sensor 32 is electronically connected to the controller 28 and transmits signals corresponding to turning direction and amount of angular displacement of the steering wheel 30 to the controller 28. The controller 28 in turn controls operation of the front wheel steering mechanism 16 and the rear wheel steering mechanism 22 that pivot the wheels $W_1$, $W_2$, $W_3$ and $W_4$ moving them accordingly to steer and turn the vehicle 10 in a manner described in greater detail below.

Figure 4:
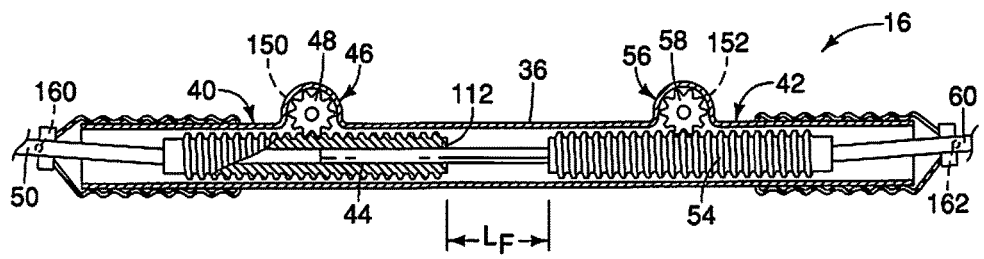
FIG. 4 is a cross-sectional view of the front wheel steering mechanism showing a right wheel steering portion, a left wheel steering portion and a tie rod in accordance with the first embodiment.

As shown in FIGS. 3 and 4, the front wheel steering mechanism 16 includes a housing 36, a right wheel steering portion 40 and a left wheel steering portion 42. As described further below, the front wheel steering mechanism 16 is a dual rack and pinion gear mechanism in which the right wheel steering portion 40 and the left wheel steering portion 42 are independently operable relative to one another.

In the depicted embodiment, the right wheel steering portion 40 has a driven member 44 (rack of rack and pinion), a right-side electric motor 46, a gear 48 (pinion gear) of the right-side electric motor 46 and a tie rod 50. The gear 48 engages linear gear teeth formed on the driven member 44. The tie rod 50 is pivotally connected to a steering arm 52a extending from a right front steering knuckle 52. The right front steering knuckle 52 includes a wheel bearing structure and axle (not shown) that support the front wheel $W_1$ in a conventional manner. Since steering knuckles, wheel bearing and axles are conventional vehicle structures, further description is omitted for the sake of brevity.

Similarly, the left wheel steering portion 42 has a driven member 54 (rack of rack and pinion), a left-side electric motor 56, a gear 58 (pinion gear) of the left-side electric motor 56 and a tie rod 60. The gear 58 engages linear gear teeth formed on the driven member 54. The tie rod 60 is pivotally connected to a steering arm 62a extending from a front steering knuckle 62. The front steering knuckle 62 includes a wheel bearing structure and axle (not shown) that support the front wheel $W_2$ in a conventional manner.

The right front suspension structure 18 includes, among other elements, a coil spring 68. The left front suspension structure 20 includes, among other elements, a coil spring 70. Since suspension structures are conventional vehicle structures, further description is omitted for the sake of brevity.

As is also shown in FIGS. 3 and 4, the rear wheel steering mechanism 22 includes a housing 76, a right wheel steering portion 80 and a left wheel steering portion 82. As described further below, the rear wheel steering mechanism 22 like the front wheel steering mechanism 16 is a dual rack and pinion gear mechanism in which the right wheel steering portion 80 and the left wheel steering portion 82 are independently operable relative to one another.

In the depicted embodiment, the right wheel steering portion 80 has a driven member 84 (rack of rack and pinion), a right-side electric motor 86, a gear 88 (pinion gear) of the right-side electric motor 86 and a tie rod 90. The gear 88 engages linear gear teeth formed on the driven member 84. The tie rod 90 is pivotally connected to a steering arm 92 extending from a right rear steering knuckle (not shown). The right rear steering knuckle includes a wheel bearing structure and axle (not shown) that support the rear wheel $W_3$ in a conventional manner. Since steering knuckles, wheel bearing and axles are conventional vehicle structures, further description is omitted for the sake of brevity.

Similarly, the left wheel steering portion 82 has a driven member 94 (rack of rack and pinion), a left-side electric motor 96, a gear 98 (pinion gear) of the left-side electric motor 96 and a tie rod 100. The gear 98 engages linear gear teeth formed on the driven member 94. The tie rod 100 is pivotally connected to a steering arm 102 extending from a front steering knuckle (not shown) that includes a wheel bearing structure and axle (not shown) that support the rear wheel $W_4$ in a conventional manner.

The right rear suspension structure 24 includes, among other elements, a coil spring 106. The left rear suspension structure 26 includes, among other elements, a coil spring 108. Since suspension structures are conventional vehicle structures, further description is omitted for the sake of brevity.

In the depicted embodiment, the front wheel steering mechanism 16 is shown at a position rearward of the right front suspension structure 18 and the left front suspension structure 20. However it should be understood from the drawings and the description herein that the front wheel steering mechanism 16 can be positioned forward of the right front suspension structure 18 and the left front suspension structure 20. Similarly, the rear wheel steering mechanism 22 is shown at a position forward of the right rear suspension structure 24 and the left rear suspension structure 26. However it should be understood from the drawings and the description herein that the rear wheel steering mechanism 22 can be positioned rearward of the right rear suspension structure 24 and the left rear suspension structure 26.

Figure 6:
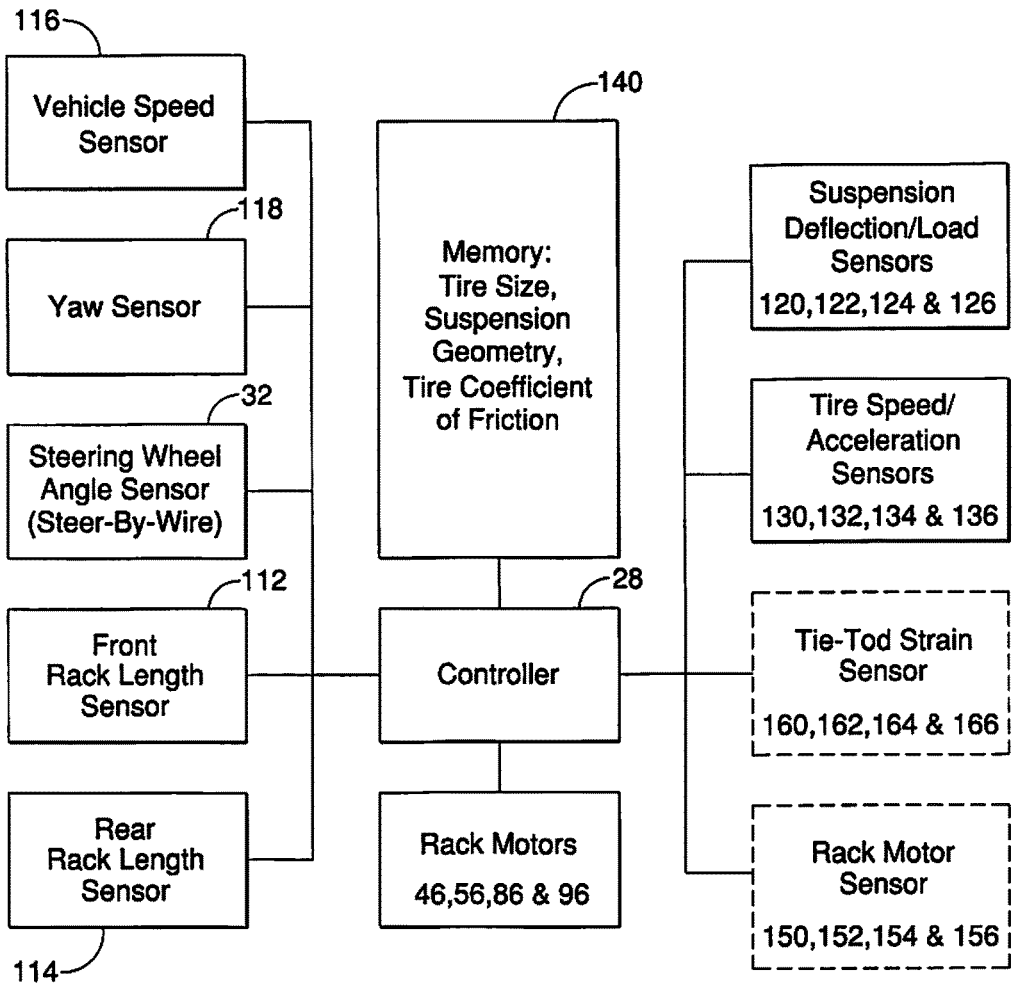
FIG. 6 is a block diagram of a controller of the adaptive steering control apparatus showing various sensors and devices attached to the controller for effecting turning and steering control of the four wheel in accordance with the first embodiment.

A description of the controller 28 is now provided with specific reference to FIG. 6. The controller 28 is in electronic communication with the sensor 32 of the steer-by-wire steering wheel assembly 14 such that the controller 28 receives signals indicating all turning and steering movement of the steering wheel 30 in real time. The controller 28 is further connected to the right-side electric motor 46 and the left-side electric motor 56 of the front wheel steering mechanism 16, and the right-side electric motor 86 and the left-side electric motor 96 of the rear wheel steering mechanism 22. Specifically, in response to movement of the steering wheel assembly 14 and signals from the sensor 32, the controller 28 sends signals to each of the right-side electric motor 46 and the left-side electric motor 56 of the front wheel steering mechanism 16, and the right-side electric motor 86 and the left-side electric motor 96 of the rear wheel steering mechanism 22 in order to turn and/or steer the vehicle 10.

The controller 28 is further electronically connected to a front rack length sensor 112 (FIGS. 4 and 6), a rear rack length sensor 114 (FIGS. 5 and 6), a vehicle speed sensor 116, a yaw sensor 118, suspension deflection/load sensors 120, 122, 124 and 126, tire speed/Acceleration sensors 130, 132, 134 and 136, and memory and/or data storage device 140.

The front rack length sensor 112 and the rear rack length sensor 114 send signals to the controller 28 that indicate deviations from an initial setting of respective ones of the front wheel steering mechanism 16 and the rear wheel steering mechanism 22. Specifically, each of the front wheel steering mechanism 16 and the rear wheel steering mechanism 22 is provided with an initial set-up. Specifically, in the front wheel steering mechanism 16, the right wheel steering portion 40 is initially spaced apart from the left wheel steering portion 42 by a predetermined distance. The right wheel steering portion 40 and the left wheel steering portion 42 of the front wheel steering mechanism 16 are spaced apart from one another by a distance $L_F$, as shown in FIG. 4. The distance $L_F$ is initially set with the predetermined distance that corresponds to a pre-calculated toe-in angle of the wheels $W_1$ and $W_2$. As is well known in vehicle technology using Ackermann steering geometry, steerable wheels, such as the wheels $W_1$ and $W_2$, when straight, are offset from a straight trajectory by a toe-in angle. Specifically, as shown in FIG. 2, when the wheels $W_1$ and $W_2$ are aimed so that the vehicle 10 moves in a straight trajectory, in the absence of a toe-in angle, the wheels $W_1$ and $W_2$ are aligned with the lines $S_1$ and $S_2$, respectively. However, in accordance with Ackermann steering geometry, the vehicle 10 is configured and adjusted such that the wheels $W_1$ and $W_2$ are offset to aim along the lines $S_{W1}$ and $S_{W2}$ when aimed straight ahead. The lines $S_1$ and $S_{W1}$ define a toe-in angle $\alpha_{T1}$ and the lines $S_2$ and $S_{W2}$ define a toe-in angle $\alpha_{T2}$. The toe-in angle is also referred to as a toe angle. Once the wheels $W_1$ and $W_2$ are turned either left or right, toe-in angles are eliminated by the geometry of the steering related structure of the vehicle 10 in order to effect the turning of the vehicle, as demonstrated in FIGS. 7 and 8, and discussed further below. Since Ackermann steering geometry and toe-in angles are conventional relationships, further description is omitted for the sake of brevity.

Figure 5:
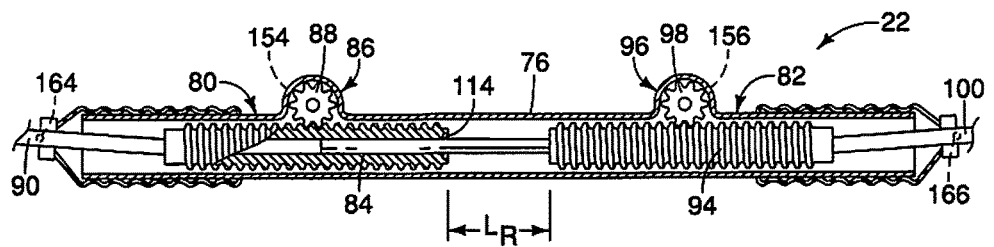
FIG. 5 is a cross-sectional view of the rear wheel steering mechanism showing a right wheel steering portion, a left wheel steering portion and a tie rod in accordance with the first embodiment.

Similarly, in the rear wheel steering mechanism 22, the right wheel steering portion 80 is initially spaced apart from the left wheel steering portion 82 by a predetermined distance. The right wheel steering portion 80 and the left wheel steering portion 82 of the rear wheel steering mechanism 22 are spaced apart from one another by a distance $L_R$, as shown in FIG. 5. The distance $L_R$ is initially set with the predetermined distance that can correspond to a pre-calculated toe-in angle of the wheels $W_3$ and $W_3$, or other pre-calculated setting (the rear wheels can be adjusted in a manner that differs from the front wheels, depending upon overall vehicle design). In other words, the wheels $W_3$ and $W_4$, when straight, can be offset from a straight trajectory by a toe-in angle, depending upon the vehicle design. During steering and turning operations, the distance $L_R$ is adjusted by the controller 28 in a manner described in greater detail below.

The vehicle speed sensor 116 can be installed at any of a variety of locations within the vehicle 10. For example, the vehicle speed sensor 116 can be located on the engine (not shown), transmission (not shown) or can be associated with any of a variety of elements within the drive train that provides an indication of vehicle speed. The vehicle speed sensor 116 provides signals to the controller 28 indicating speed of the vehicle 10 and changes in the speed of the vehicle 10.

The yaw sensor 118 can also be installed at any of a variety of locations within the vehicle 10. The yaw sensor 118 provides signals to the controller 28 that indicate deviations from a straight trajectory of the vehicle 10. For example, the yaw sensor 118 can detect centrifugal forces during turning or steering operations and provide signals to the controller 28 indicating same.

The suspension deflection/load sensors 120, 122, 124 and 126 are attached to corresponding ones of the coil springs 68, 70, 106 and 108 and send signals to the controller 28 indicating changes in compression and expansion of each of the coil springs 68, 70, 106 and 108. The signals from the suspension deflection/load sensors 120, 122, 124 and 126 provide the controller 28 with information that is used to calculate changes in forces action on the wheels $W_1$, $W_2$, $W_3$ and $W_4$ during turning and steering operations. For example, if one or more of the coil springs 68, 70, 106 and 108 is undergoing measurable changes in length due to being compressed, the signals from the corresponding one or ones of the suspension deflection/load sensors 120, 122, 124 and 126 provides signals indicating an increase in load at the specific coil spring(s). This increase in load equates to an increase in load acting on the corresponding wheel of the wheels $W_1$, $W_2$, $W_3$ and $W_4$. The controller 28 uses the signals from the suspension deflection/load sensors 120, 122, 124 and 126 to determine, wheel by wheel, the changes in forces acting on each of the wheels $W_1$, $W_2$, $W_3$ and $W_4$.

In the first embodiment, the suspension deflection/load sensors 120, 122, 124 and 126 are load detection devices. The load detection device in accordance with the various embodiments described herein are devises (sensors) that are configured to measure a condition indicative of vehicle loads that ultimately act upon each of the wheels $W_1$, $W_2$, $W_3$ and $W_4$. The load detection devices in the various embodiments described herein are spaced apart from and separate from the steering knuckles of the vehicle 10.

The controller 28 calculates toe angle adjustments (lengths $L_F$ and $L_R$) for each of the right wheel steering portion 40 and the left wheel steering portion 42, and the right wheel steering portion 80 and the left wheel steering portion 82, partly in response to determining a load on each of the wheels $W_1$, $W_2$, $W_3$ and $W_4$ based on signals from the suspension deflection/load sensors 120, 122, 124 and 126 (the load detection devices). Further, as described further below, the controller 28 continually evaluates and makes appropriate adjustments to the toe angle adjustments (the lengths $L_F$ and $L_R$) in response to changes in turning and steering movements effected by the front wheel steering mechanism 14.

The tire speed/acceleration sensors 130, 132, 134 and 136 are depicted as being located on respective steering arms 52a, 62a, 92 and 102 but can be located on any portion of the steering knuckles or suspension. Further, the tire speed/acceleration sensors 130, 132, 134 and 136 can have two parts, a first part located on or within the wheel or wheel rim, and, another part on an adjacent portion of the suspension. In other words, the tire speed/acceleration sensors 130, 132, 134 and 136 can be installed at any location that can provide an accurate indication of the rotational speed of each of the wheels $W_1$, $W_2$, $W_3$ and $W_4$. The tire speed/acceleration sensors 130, 132, 134 and 136 transmit either wirelessly or directly to the controller 28, signals that indicate the current rotating speed (and changes in rotation speed) of each of the wheels $W_1$, $W_2$, $W_3$ and $W_4$.

The memory and/or data storage device 140 is directly connected to or is integrated with the controller 28 such that the controller 28 can store and access data to and from the memory and/or data storage device 140. For example, the memory and/or data storage device 140 can store all information relating to the size of the wheels $W_1$, $W_2$, $W_3$ and $W_4$, the initial settings of the front wheel steering mechanism 16, the rear wheel steering mechanism 22, all dimensional and geometric information relating to steering components and suspension components of the vehicle 10, including camber, caster, toe-in and turning radius data of the vehicle 10. The memory and/or data storage device 140 is also used by the controller 28 to continuously store and update data of previously calculated adjustments to the lengths $L_F$ and $L_R$ of the front wheel steering mechanism 16 and the rear wheel steering mechanism 22.

The controller 28 uses data from the various sensors in order to estimate and calculate fine adjustments to the lengths $L_F$ and $L_R$ of the front wheel steering mechanism 16 and the rear wheel steering mechanism 22, respectively. The controller 28 further uses data from the various sensors in order to estimate and calculate the amount of turning of each of the wheels $W_1$, $W_2$, $W_3$ and $W_4$, necessary in response to turning and steering of the vehicle 10 made by a vehicle operator using the steer-by-wire steering wheel assembly 14, as is described further below.

A description of an example of operations conducted by the controller 28 is now provided with specific reference to FIGS. 7-10. It should be understood from the drawings and the description herein that the controller 28 is continuously making calculations and appropriate adjustments during normal driving operation of the vehicle 10. These estimations and calculations occur repeatedly every few milliseconds. Therefore, in real time, the controller 28 makes such calculations and adjustments many times per second.

Figure 7:
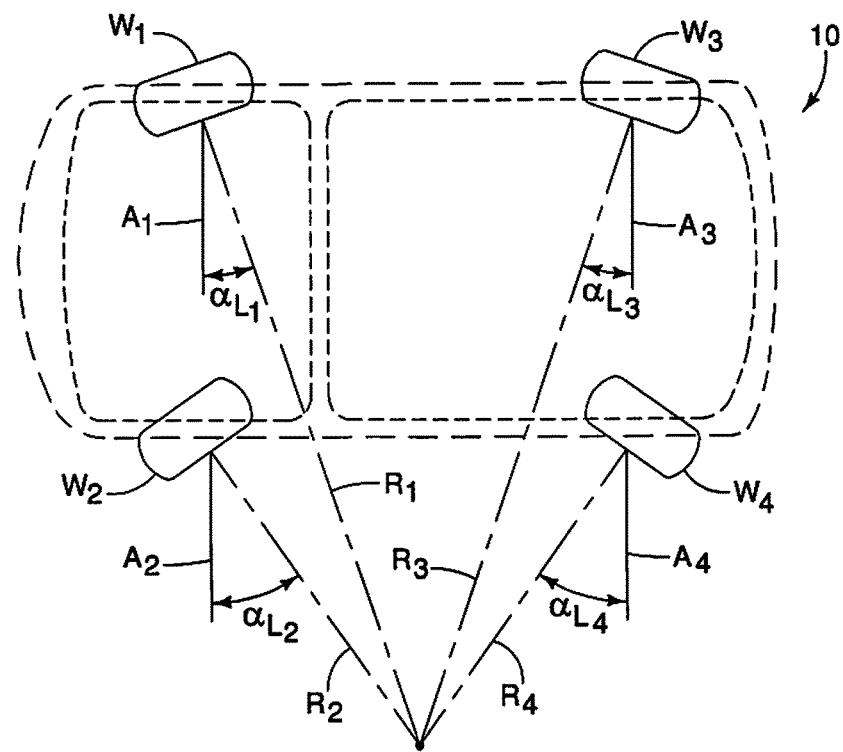
FIG. 7 is a schematic view of the vehicle showing the four wheels being individually angularly displaced in response to a left turn in accordance with the first embodiment.
Figure 8:
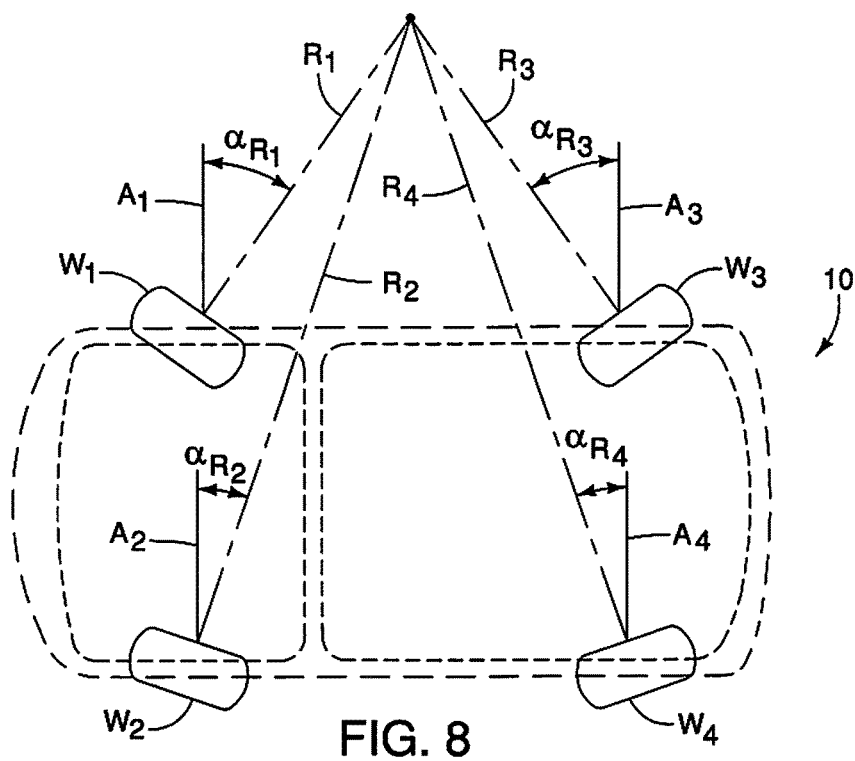
FIG. 8 is another schematic view of the vehicle showing the four wheels being individually angularly displaced in response to a right turn in accordance with the first embodiment.

FIGS. 7 and 8 show a schematic layout of the vehicle 10 and the four wheels $W_1$, $W_2$, $W_3$ and $W_4$. In FIG. 7, the vehicle 10 is making a left turn. The front wheels $W_1$ and $W_2$, are turned such that their respective forward areas turned left and the rear wheels $W_3$ and $W_4$ have their forward areas turned to the right. In FIG. 8, the vehicle 10 is making a right turn. The front wheels $W_1$ and $W_2$, are turned such that their respective forward areas turned right and the rear wheels $W_3$ and $W_4$ have their forward areas turned to the left. In FIGS. 7 and 8, each wheel defines an axis of rotation. Assuming all four wheels $W_1$, $W_2$, $W_3$ and $W_4$ are positioned to move the vehicle 10 straight ahead in a linear trajectory, each respective wheel $W_1$, $W_2$, $W_3$ and $W_4$ defines a corresponding axis of rotations. In FIGS. 7 and 8, theses straight trajectory axes of rotation are labeled axis $A_1$, axis $A_2$, axis $A_3$ and axis $A_4$. The axis $A_1$ and axis $A_2$ are approximately co-linear when the vehicle 10 is moving in a straight trajectory, and the axis $A_3$ and axis $A_4$ are similarly approximately co-linear when the vehicle 10 is moving in a straight trajectory. Further, when the vehicle 10 is moving in a straight trajectory, axis $A_1$ and axis $A_3$ are approximately parallel to one another and axis $A_2$ and axis $A_4$ are approximately parallel to one another.

However, when the vehicle 10 makes a left turn, the wheels $W_1$, $W_2$, $W_3$ and $W_4$ are turned as shown in FIG. 7, and when the vehicle 10 makes a right turn, the wheels $W_1$, $W_2$, $W_3$ and $W_4$ are turned as shown in FIG. 8. In accordance with Ackermann steering geometry, the controller 28 determines an imaginary point that represents a center of rotation $C_L$ (for left turns) about which the vehicle 10 turns, and a center of rotation $C_R$ (for right turns) about which the vehicle 10 turns. Each of the wheels $W_1$, $W_2$, $W_3$ and $W_4$ is a different distance away from the center of rotation. Specifically, the wheel $W_1$ is located at a distance $R_1$ from the center of rotation $C_L$ and the center of rotation $C_R$. The wheel $W_2$ is located at a distance $R_2$ from the center of rotation $C_L$ and the center of rotation $C_R$. The wheel $W_3$ is located at a distance $R_3$ from the center of rotation $C_L$ and the center of rotation $C_R$. The wheel $W_4$ is located at a distance $R_4$ from the center of rotation $C_L$ and the center of rotation $C_R$. The distances $R_1$, $R_2$, $R_3$ and $R_4$ are variables that change as the vehicle 10 is turned and/or steered while driving. Further as demonstrated in FIGS. 7 and 8, the distances $R_1$, $R_2$, $R_3$ and $R_4$ are rarely, if ever, equal to one another.

In accordance with Ackermann steering geometry during a left turn as shown in FIG. 7, the wheel $W_1$ undergoes angular displacement $\alpha_{L1}$ relative the axis $A_1$ and the direction of the line defined relative to the distance $R_1$, the wheel $W_2$ undergoes angular displacement $\alpha_{L2}$ relative the axis $A_2$ and the direction of the line defined relative to the distance $R_2$, the wheel $W_3$ undergoes angular displacement $\alpha_{L3}$ relative the axis $A_3$ and the direction of the line defined relative to the distance $R_3$, and the wheel $W_4$ undergoes angular displacement $\alpha_{L4}$ relative the axis $A_4$ and the direction of the line defined relative to the distance $R_4$. Similarly, during a right turn as shown in FIG. 8, the wheel $W_1$ undergoes angular displacement $\alpha_{R1}$, the wheel $W_2$ undergoes angular displacement $\alpha_{R2}$, the wheel $W_3$ undergoes angular displacement $\alpha_{R3}$, and the wheel $W_4$ undergoes angular displacement $\alpha_{R4}$. As shown in FIGS. 7 and 8, the various displacement angles are unique for each of the wheels $W_1$, $W_2$, $W_3$ and $W_4$.

Hence, the controller 28 is constantly evaluating and re-evaluating data as the vehicle 10 is driven, steered and turned in order to accurately turn the wheels $W_1$, $W_2$, $W_3$ and $W_4$ and make adjustments to the lengths $L_F$ and $L_R$ of the front wheel steering mechanism 16 and the rear wheel steering mechanism 22, respectively.

Basically, the controller 28 performs as following. In response to a vehicle operator manually operating the steer-by-wire steering wheel assembly 14 to steer and turn the vehicle 10, the controller 28 independently controls movement of each of the right wheel steering portion 40 and 80 and the left wheel steering portions 42 and 82 of the front wheel steering mechanism 16 and the rear wheel steering mechanism 22. The controller 28 determines vehicle loads acting on each of the wheels $W_1$, $W_2$, $W_3$ and $W_4$ of the vehicle 10 at a location spaced apart from and separate from the various steering knuckles since the suspension deflection/load sensors 120, 122, 124 and 126 are spaced apart from the steering knuckles of the vehicle 10. The controller 28 calculates a load for each of the wheel $W_1$, $W_2$, $W_3$ and $W_4$. For example, the calculated load for each of the wheel $W_1$, $W_2$, $W_3$ and $W_4$ can be centrifugal loads during turning operations and corresponding lateral loads acting on each wheel, and/or changes in normal and longitudinal loads acting on each wheel, including changes in the overall weight load acting on each wheel. Further, the calculated load can be considered to be any change in the load (normal, lateral, longitudinal or centrifugal) acting that portion of each wheel that contacts the surface of the road. Based on the calculated load acting on each wheel, the controller 28 electronically determines a toe angle adjustment for the right wheel steering portion 40 and the left wheel steering portion 42, and a toe angle adjustment for the right wheel steering portion 80 and the left wheel steering portion 82 by comparing tire loads with recorded tire slip angle data. The controller 28 makes the toe angle adjustments by changing the distances $L_F$ and $L_R$ of the front wheel steering mechanism 16 and the rear wheel steering mechanism 22, respectively.

Figure 9:
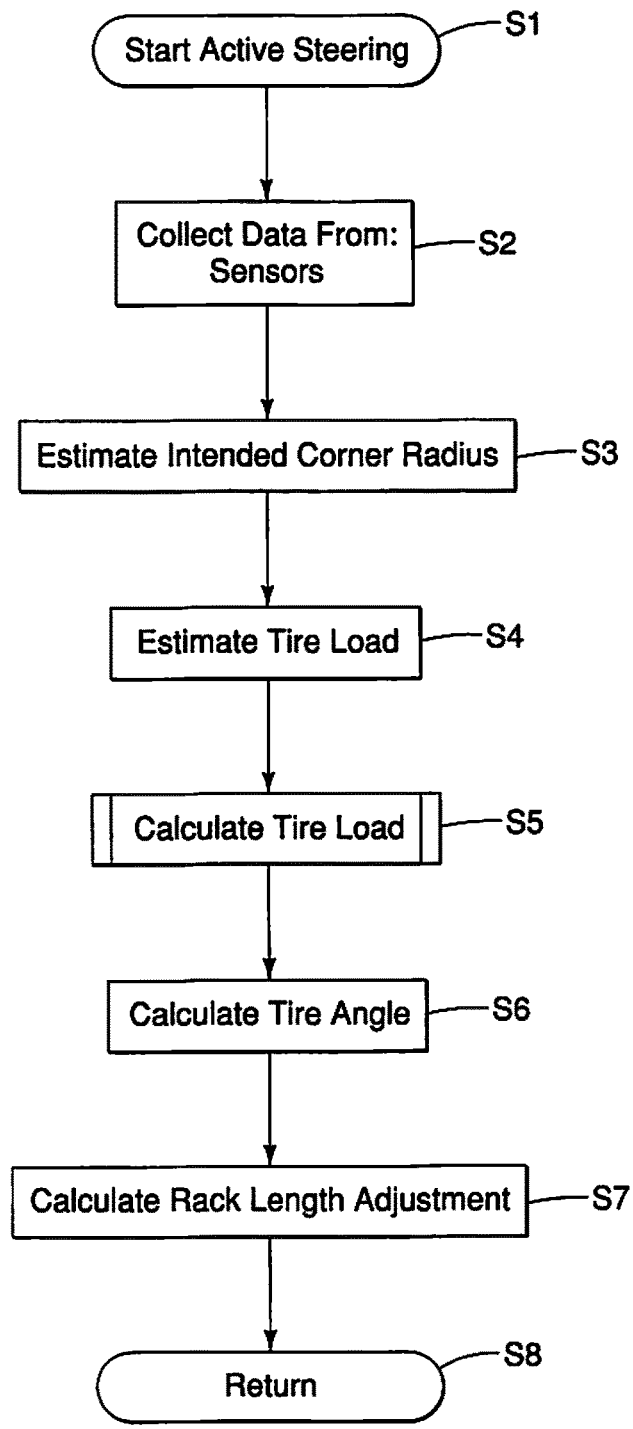
FIG. 9 is a flowchart depicting operations performed by the controller of the adaptive steering control apparatus relating to determining adjustments to the front and rear wheel steering mechanism of the right and left side wheels in accordance with the first embodiment.
Figure 10:
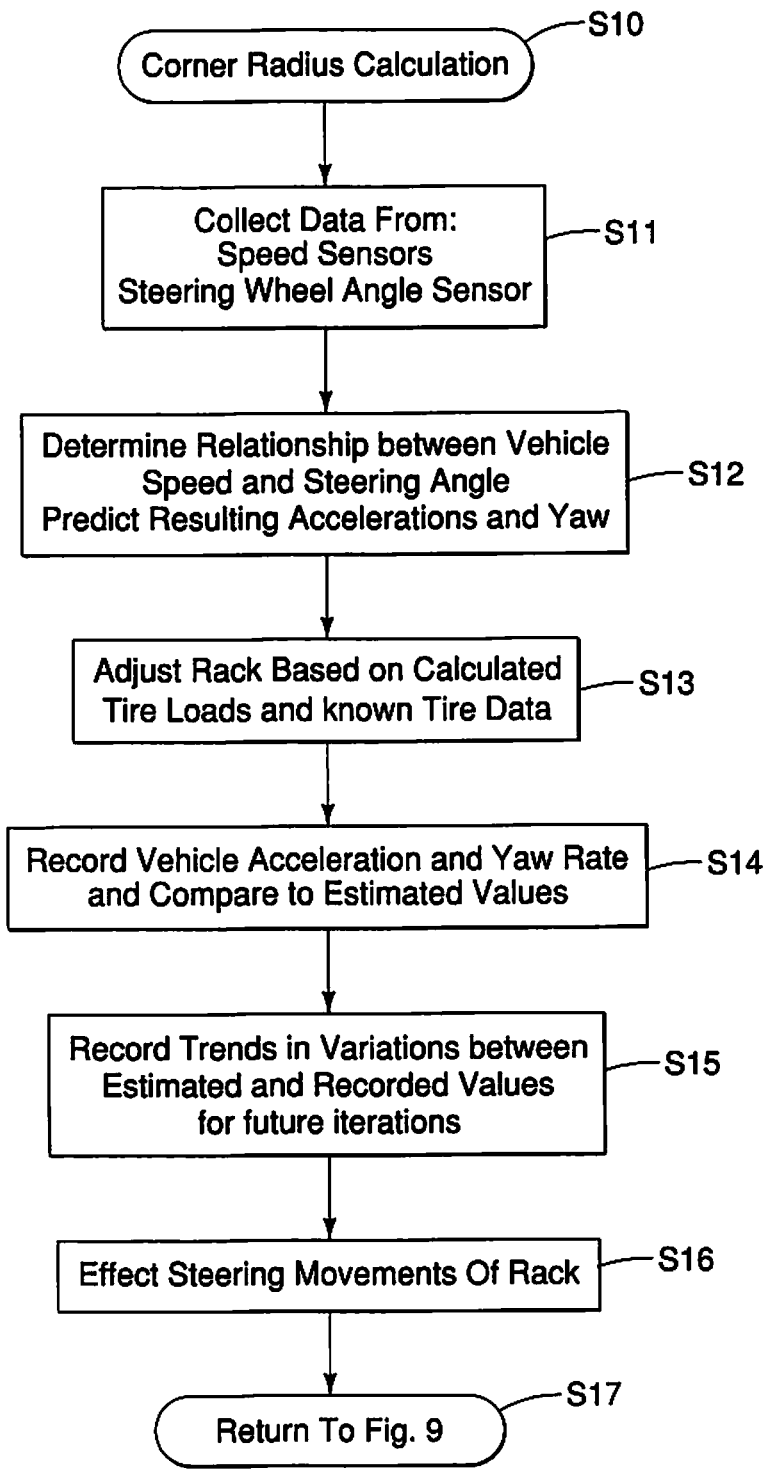
FIG. 10 is a flowchart depicting operations performed by the controller of the adaptive steering control apparatus in the determination of steering and turning movements of the front and rear wheel steering mechanisms in accordance with the first embodiment.

A further description of an example of the operations conducted by the controller 28 is now provided with specific reference to FIGS. 9 and 10.

In FIG. 9, operations relating to adjustments to the rack lengths of the front wheel steering mechanism 16 and the rear wheel steering mechanism 22. In other words, the steps in FIG. 9 represent the operations the controller 28 conducts in order to adjust the distance $L_F$ (the distance between the driven member 44 of the right wheel steering portion 40 and the driven member 54 of the left wheel steering portion 42) and adjust the distance $L_R$ (the distance between the driven member 84 of the right wheel steering portion 80 and the driven member 94 of the left wheel steering portion 82).

In step S1, the engine 10 is started and active steering is initialized with the controller 28 beginning to operation and check each of the sensors and devices it is connected to or otherwise in electronic communication with.

At step S2, the controller 28 collects data from the yaw sensor 118, the vehicle speed sensor 116, the load detection sensors (in the first embodiment, the suspension deflection/load sensors 120, 122, 124 and 126), the tire speed/Acceleration sensors 130, 132, 134 and 136, and the sensor 32 of the steer-by-wire steering wheel assembly 14. The yaw sensor 118 detects changes in trajectory and detects presence of centrifugal forces acting on the vehicle 10 and sends corresponding signals to the controller 28. The vehicle speed sensor 116 provides the controller 28 with current vehicle speed information. The load detection sensors (the suspension deflection/load sensors 120, 122, 124 and 126) send signals indicative of forces acting on each of the wheels $W_1$, $W_2$, $W_3$ and $W_4$, respectively. Similarly, the tire speed/Acceleration sensors 130, 132, 134 and 136, each send differing signals indicating speed of rotation of each of the wheels $W_1$, $W_2$, $W_3$ and $W_4$, respectively. The sensor 32 provides the controller 28 with constant data relating to steering and turning movements made by the vehicle operator operating the steering wheel 30.

At step S3, the controller 28 estimates the intended cornering radius in response to determining that the vehicle 10 is being turned or steered in a specific direction by operation of the steering wheel 30. Estimation of the intended corner radius includes anticipating the location of the center of rotation $C_L$ or the center of rotation $C_R$. and the distances $R_1$, $R_2$, $R_3$ and $R_4$ (FIGS. 7 and 8). The estimating of the intended cornering radius can also include using past cornering radius data stored in the memory 140.

At step S4, the controller 28 estimates the tire load on each of the wheels $W_1$, $W_2$, $W_3$ and $W_4$. The controller 28 uses the data and information collected in steps S2 and S3, including data of past tire load calculations stored in memory 140, to determine the estimated tire load for each of the wheels $W_1$, $W_2$, $W_3$ and $W_4$.

At step S5, the actual tire load at each of the wheels $W_1$, $W_2$, $W_3$ and $W_4$ is calculated as is set forth in the chart depicted in FIG. 11, and described in greater detail below.

At step S6, the controller 28 calculates the tire angles $\alpha_{R1}$, $\alpha_{R2}$, $\alpha_{R3}$ and $\alpha_{R4}$ (FIG. 8) if a right turn or right steering adjustment is detected or tire angles $\alpha_{L1}$, $\alpha_{L2}$, $\alpha_{L3}$ and $\alpha_{L4}$ (FIG. 7) if a left turn or left steering adjustment is detected.

At step S7, the controller 28 calculates the rack length adjustment for the front wheel steering mechanism 16 and the rear wheel steering mechanism 22. Specifically, the controller 28 calculates any required adjustments to the distance $L_F$ and the distance $L_R$ of the front wheel steering mechanism 16 and the rear wheel steering mechanism 22, respectively.

At step S8, the controller 28 moves to the operations set forth in FIG. 10. The controller 28 continues repeated iterations of the estimation and calculation operations.

Further, the controller 28 is provided with failsafe logic. Specifically, if at any point in the operations set forth in FIGS. 9 and 10 the controller 28 detects a problem with the various sensors and devices attached thereto, the controller 28 can operate in a default mode where the distance $L_F$ and the distance $L_R$ of the front wheel steering mechanism 16 and the rear wheel steering mechanism 22, respectively, return to the pre-calculated initial settings and adjustments to the distance $L_F$ and the distance $L_R$ cease. In the default mode, all turning operations and steering operations by the vehicle operator using the steer-by-wire steering wheel assembly 14 result in direct operation of the front wheel steering mechanism 16 and the rear wheel steering mechanism 22 to make corresponding vehicle turns and vehicle steering movements.

A description of the operations conducted by the controller 28 and shown in FIG. 10 is now provided.

At step S10, the controller 28 begins corner radius calculations in response to the vehicle operator using the steer-by-wire steering wheel assembly 14.

At step S11, the controller 28 continuously collects and evaluates data received from the vehicle speed sensor 116, the tire speed/Acceleration sensors 130, 132, 134 and 136, and from the sensor 32 of the steer-by-wire steering wheel assembly 14.

At step S12, the controller 28 determines relationships between vehicle speed, the wheel speeds (for each wheel $W_1$, $W_2$, $W_3$ and $W_4$ and steering angles (tire angles) for each wheel $W_1$, $W_2$, $W_3$ and $W_4$. The controller 28 can use the tire angle calculations made at step S6, where the tire angles $\alpha_{R1}$, $\alpha_{R2}$, $\alpha_{R3}$ and $\alpha_{R4}$ (FIG. 8) if a right turn or right steering adjustment is being made, or tire angles $\alpha_{L1}$, $\alpha_{L2}$, $\alpha_{L3}$ and $\alpha_{L4}$ (FIG. 7) if a left turn or left steering adjustment is being made. However, it should be understood that the steering angles are continuously calculated as the steering wheel 30 is continuously being manipulated by the vehicle operator when the vehicle 10 is in motion.

At step S13, the controller 28 operates the right-side electric motor 46, the left-side electric motor 56, the right-side electric motor 86 and the left-side electric motor 96, in order to adjust the distance $L_F$ and the distance $L_R$ of the front wheel steering mechanism 16 and the rear wheel steering mechanism 22, respectively. It should be understood from the drawings and the description herein that the adjustment of the distance $L_F$ and the distance $L_R$ can be a minute adjustment measured in millimeters and may require only a small adjustment of each of the right-side electric motor 46, the left-side electric motor 56, the right-side electric motor 86 and the left-side electric motor 96. It should also be understood from the drawings and the description herein that the adjustments to the distance $L_F$ and the distance $L_R$ can be made simultaneously with actual turning operations and steering operations (step S16) made by the vehicle operator as the steering wheel 30 is turned or moved in steering operations. In step S13, the controller 28 bases the adjustments not on the estimated tire load from step S4, but rather makes the adjustments based on the calculated tire load in step S5 and the determinations made in step S12.

At step S14, the controller 28 records in the memory 140 the detected vehicle acceleration and yaw rate changes based upon the data received from the yaw sensor 118, the vehicle speed sensor 116 and the tire speed/Acceleration sensors 130, 132, 134 and 136. This information is compared with previously stored values in memory 140. At step S15, the recorded data is evaluated to detect trends in the stored data for future iterations. For example, changes in the data can provide an indication of wear or changes in tolerances in the steering system, or tire wear.

At step S16, the controller 28 operates the right-side electric motor 46, the left-side electric motor 56, the right-side electric motor 86 and the left-side electric motor 96, in order to effect turning operations and/or steering operations in accordance with the movements by the vehicle operator of the steering wheel 30.

It should be understood from the drawings and description herein that the operations in the steps depicted in FIGS. 9 and 10 take only milliseconds to be performed. The vehicle operator experiences no noticeable delays in the turning of the steering wheel 30 and the turning of the wheels $W_1$, $W_2$, $W_3$ and $W_4$.

Figure 11:
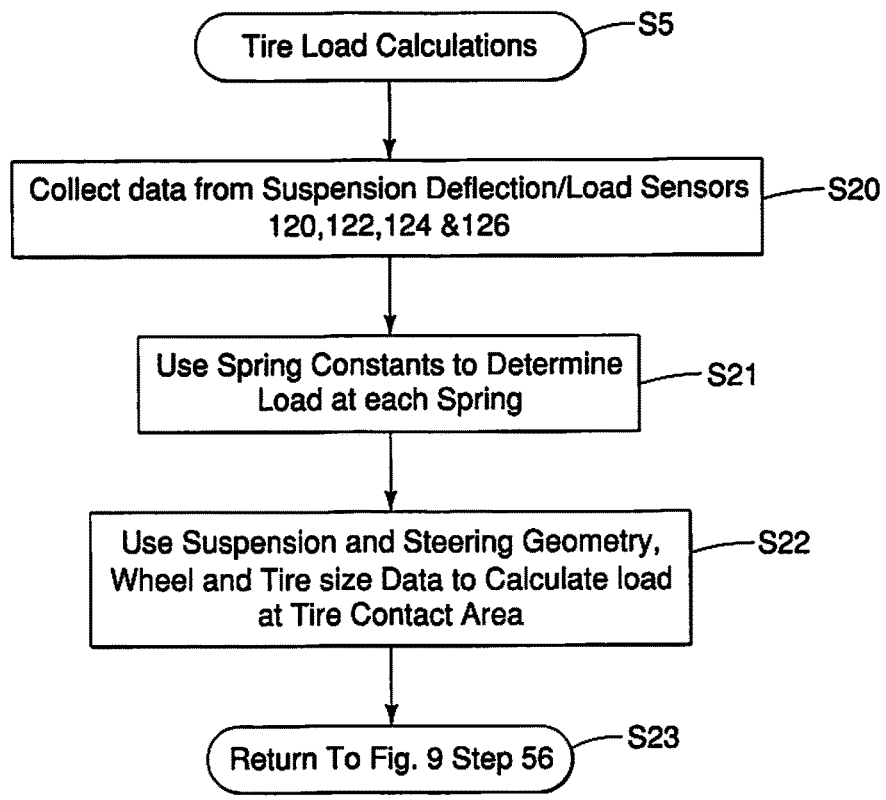
FIG. 11 is another flowchart depicting operations performed by the controller in the determination of overall load at a contact area of each of the four wheels in accordance with the first embodiment.

A description is now provided for the steps shown in FIG. 11 corresponding to step S5 in FIG. 9. At step S20, the controller 28 collects and evaluates the data received from the suspension deflection/load sensors 120, 122, 124 and 126. The suspension deflection/load sensors 120, 122, 124 and 126 deflect (compress or expand) in response to changes in the forces at that area of the vehicle 10.

At step S21, the controller 28 uses data stored in the memory 140 such as spring constants of the coil springs 68, 70, 106 and 106, in order to evaluate the detected changes in load.

At step S22, the controller 28 uses suspension and steering geometry related data, along with wheel related data to calculate forces acting on each wheel $W_1$, $W_2$, $W_3$ and $W_4$ at a tire contact area of each wheel $W_1$, $W_2$, $W_3$ and $W_4$. More specifically, if one of the suspension deflection/load sensors 120, 122, 124 and 126 detects an increase in load, that increase in load corresponds to changes in the forces between a contact area of a corresponding one of the wheels $W_1$, $W_2$, $W_3$ and $W_4$ and the surface of the road the wheel contacts. Using known data concerning the wheels $W_1$, $W_2$, $W_3$ and $W_4$ such as diameter, inflation pressure, weight of the vehicle 10, the geometry of the steering mechanism structure and the data from the suspension deflection/load sensors 120, 122, 124 and 126, the controller 28 can continually calculate and re-calculate the actual forces generated at the tire contact area. The tire contact area is an area between the surface of the road and each of the wheels $W_1$, $W_2$, $W_3$ and $W_4$ where portion of the wheels $W_1$, $W_2$, $W_3$ and $W_4$ make contact with the surface of the road.

The forces acting on each of the wheels $W_1$, $W_2$, $W_3$ and $W_4$ provides the controller 28 with accurate set of data that can be used to make toe (aka toe-in angle) adjustments.

At step S23, operation returns to FIG. 9 and step S6.

Determination of the loads acting on each of the wheels $W_1$, $W_2$, $W_3$ and $W_4$ enables the controller 28 to more precisely make toe angle adjustments and turning operations and steering operations based on current conditions. More specifically, the calculation the toe angle adjustments (lengths $L_F$ and $L_R$) described above, and calculations of tire angles $\alpha_{R1}$, $\alpha_{R2}$, $\alpha_{R3}$ and $\alpha_{R4}$ (FIG. 8) or tire angles $\alpha_{L1}$, $\alpha_{L2}$, $\alpha_{L3}$ and $\alpha_{L4}$, made by the controller 28 are based on current conditions. The controller 28 uses current speed of each wheel, current load on each individual wheel and yaw rate from the yaw sensor 118 to make the toe angle adjustment sand the tire angle movements.

In the absence of determining loads acting on the wheels $W_1$, $W_2$, $W_3$ and $W_4$ the controller 28 would be relying primarily on the Ackermann steering geometry of the vehicle 10 for turning and steering operations. At slow speeds (under, for example, 20 miles per hour), a turning operation using only the Ackermann steering geometry generates only a small degree of tire slippage and a small degree of corresponding tire wear. However, when the controller 28 includes the tire load at each wheel in the determination of toe angle adjustments and turning operations, as described above, tire slippage and tire wear is reduced. For example, when turning left, the front right wheel $W_1$ experiences an increase in tire load forces. Increased tire load forces causes the front right wheel $W_1$ to turn at an angle that is not as large as it should be causing tire slippage and wear. The controller 28 having the tire load data, can compensate by increasing or decreasing the toe angle adjustments (lengths $L_F$ and $L_R$) thus affecting the tire angles $\alpha_{R1}$, $\alpha_{R2}$, $\alpha_{R3}$ and $\alpha_{R4}$ (FIG. 8) or tire angles $\alpha_{L1}$, $\alpha_{L2}$, $\alpha_{L3}$ and $\alpha_{L4}$, so that each wheel $W_1$, $W_2$, $W_3$ and $W_4$ makes optimal contact with the road surface and turns at an optimal angle for the detected conditions.

It should be understood from the drawings and the description herein that the adaptive steering control apparatus 12 can also be employed on vehicle having only two steerable wheels. Specifically, the rear wheel steering mechanism 22 can be eliminated and replaced with conventional rear wheels that are not steerable leaving the front wheel steering mechanism 16 intact. All the logic set forth above applies, but only to front steerable wheels, such as wheels $W_1$ and $W_2$.

The above described embodiment of the adaptive steering control apparatus 12 is disclosed as being used in the vehicle 10 where all four wheels $W_1$, $W_2$, $W_3$ and $W_4$, are steerable wheels. However, it should be understood from the drawings and the description herein that the adaptive steering control apparatus 12 can be modified for use in a vehicle where only two of the wheels are steerable wheels and still be within the scope of the invention. In other words, a vehicle can be provided with the above described front wheel steering mechanism 16 and not provide with the rear wheel steering mechanism 22, where instead, the rear of such a vehicle is provided with two rear wheels that are not steerable wheels.

Second Embodiment

Figure 12:
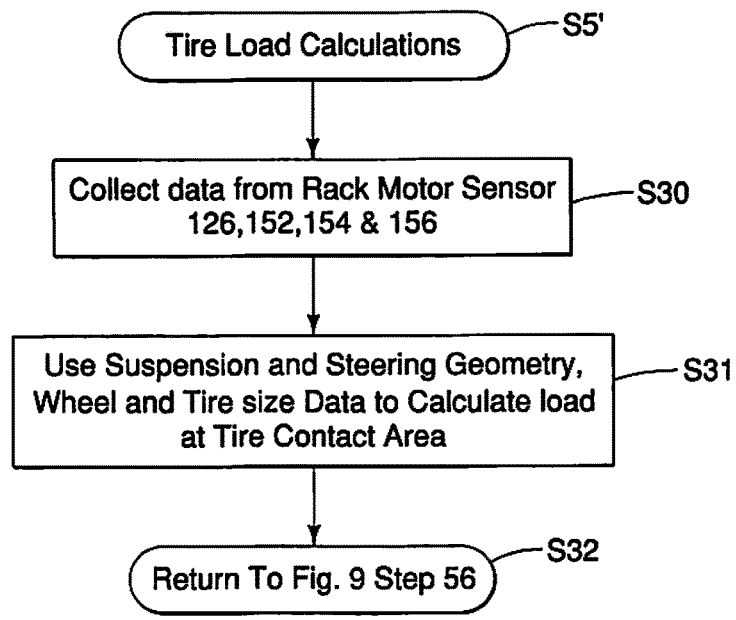
FIG. 12 is a flowchart depicting operations performed by the controller in the determination of overall load at a contact area of each of the four wheels in accordance with a second embodiment.

Referring now to FIG. 12, a tire load calculation operation S5' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, all of the features described above in FIGS. 1-10 are included except for two modifications and addition of different load detection sensors.

Specifically, as shown in FIGS. 4 and 5, the motor 46 is provided with a sensor 150, the motor 56 is provide with a sensor 152, the motor 86 is provide with a sensor 154 and the motor 96 is provide with a sensor 156. In FIG. 9 at step S2, the load detection sensors 120, 122, 124 and 126 are replaced by the sensors 150, 152, 154 and 156 in the collection of sensor data. Further, in FIG. 9, step S5 is replaced with step S5' as shown in FIG. 12. In other words, in the first embodiment, tire load is calculated according the steps set forth in FIG. 11, and in the second embodiment, the tire load is calculated according to the steps set forth in FIG. 12.

The sensors 150, 152, 154 and 156 are coupled to the coils of the corresponding one of the motors 46, 56, 86 and 96. Specifically, the sensors 150, 152, 154 and 156 are detection circuits that measure resistive forces within each of the electric motors 46, 56, 86 and 96. When there is an increased level of force between a road surface and a corresponding one of the wheels $W_1$, $W_2$, $W_3$ and $W_4$, the associated one of the motors 46, 56, 86 and 96 experiences an increase in resistance due to the additional force acting on the one of the wheels $W_1$, $W_2$, $W_3$ and $W_4$. Consequently, in order to counteract the increased level of force on the one of the wheels $W_1$, $W_2$, $W_3$ and $W_4$, the corresponding one of the motors 46, 56, 86 and 96 experiences an increased level of resistance that is measured by the corresponding one of the sensors 150, 152, 154 and 156. The change in resistance measured by the sensors 150, 152, 154 and 156 is used by the controller 28 to determine changes in tire loads at each of the wheels $W_1$, $W_2$, $W_3$ and $W_4$.

Consequently at step S30, the controller 28 collects data from the sensors 150, 152, 154 and 156. At step S31, the controller 28 calculates the tire load at tire contact areas corresponding to each of the wheels $W_1$, $W_2$, $W_3$ and $W_4$ using the data from the sensors 150, 152, 154 and 156 along with suspension and steering geometry, and wheel and tire size stored in memory 140.

At step S32, operation returns to FIG. 9 and step S6.

Third Embodiment

Figure 13:
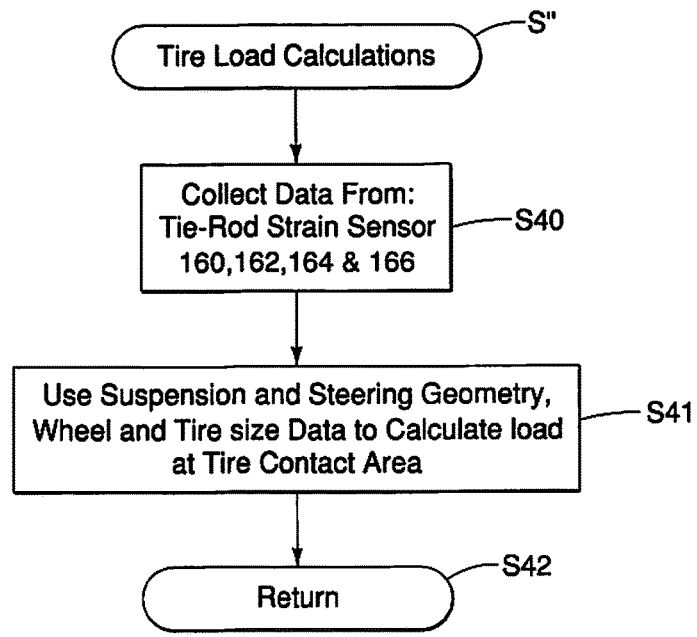
FIG. 13 is a flowchart depicting operations performed by the controller in the determination of overall load at a contact area of each of the four wheels in accordance with a third embodiment.

Referring now to FIG. 13, a tire load calculation operation S5" in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a double prime (").

In the third embodiment, all of the features described above in FIGS. 1-10 are included except for two modifications and addition of supplemental sensors.

Specifically, as shown in FIGS. 4 and 5, the tie rod 50 is provided with a sensor 160, the tie rod 60 is provide with a sensor 162, the tie rod 90 is provide with a sensor 164 and the tie rod 100 is provide with a sensor 166. In FIG. 9 at step S2, data is not collected from the load detection sensors 120, 122, 124 and 126, but rather is collected from the sensors 160, 162, 164 and 166. Further, in FIG. 9, step S5 is replaced with step S5' as shown in FIG. 13. In other words, in the first embodiment, tire load is calculated according the steps set forth in FIG. 11. In the third embodiment, the tire load is calculated according to the steps set forth in FIG. 13.

The sensors 160, 162, 164 and 166 are attached to respective ones of the tie rods 50, 60, 90 and 100. Specifically, the sensors 160, 162, 164 and 166 are, for example, strain gauges or similar sensors that measure forces acting on respective ones of the tie rods 50, 60, 90 and 100. When there is an increased level of force between a road surface and a corresponding one of the wheels $W_1$, $W_2$, $W_3$ and $W_4$, the associated one of the tie rods 50, 60, 90 and 100 experiences an increase in strain due to the additional force acting on the one of the wheels $W_1$, $W_2$, $W_3$ and $W_4$. The changes in strain on each of the tie rods 50, 60, 90 and 100 is measured by the sensors 160, 162, 164 and 166 are used by the controller 28 to determine changes in tire loads at each of the wheels $W_1$, $W_2$, $W_3$ and $W_4$.

At step S40, the controller 28 collects data from the sensors 160, 162, 164 and 166. At step S41, the controller 28 calculates the tire load at tire contact areas corresponding to each of the wheels $W_1$, $W_2$, $W_3$ and $W_4$ using the data from the sensors 160, 162, 164 and 166 along with suspension and steering geometry, and wheel and tire size stored in memory 140.

At step S42, operation returns to FIG. 9 and step S6.

Fourth Embodiment

Figure 14:
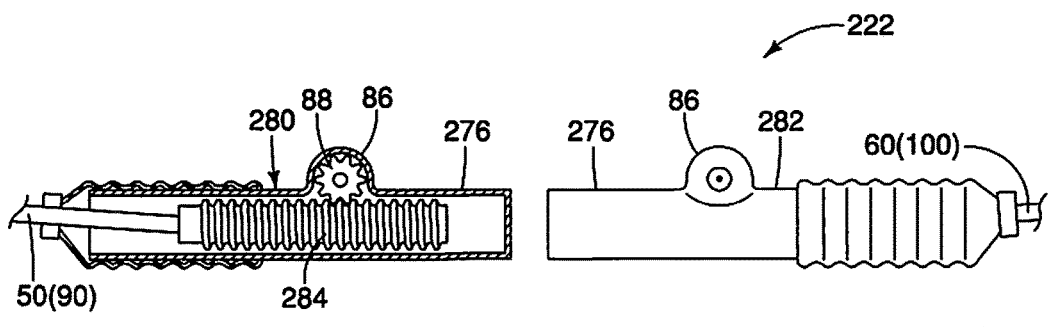
FIG. 14 is a cross-sectional view of a wheel steering mechanism having separate right and left wheel steering portions in accordance with a fourth embodiment.

Referring now to FIG. 14, a wheel steering mechanism 222 in accordance with a fourth embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

The wheel steering mechanism 222 can replace one or both of the front wheel steering mechanism 16 and/or the rear wheel steering mechanism 22 of the first embodiment. The wheel steering mechanism 222 includes a right wheel steering portion 280 and a left wheel steering portion 282 that are identical, separate and spaced apart from one another. Since the right wheel steering portion 280 and the left wheel steering portion 282 are identical, description of one applies equally to both.

The right wheel steering portion 280 includes a housing 276 with a driven member 284 (a rack of a rack and pinion arrangement), motor 86 and gear 88 (pinion gear) that engages gear teeth on the driven member 284. The motor 86 is identical to the motors 46 and 56. In the right wheel steering portion 280 the driven member 284 is connected to the tie rod 50 (or the tie rod 90) and the left wheel steering portion 280 is connected to the tie rod 60 (or the tie rod 100). The controller 28 is connected to the motors 86 of the wheel steering mechanism 222. The motors 86 are precision movement motors, such as stepper motors that include feedback circuits that provide the controller 28 with consistent positioning data that is used by the controller 28 to adjust the distances corresponding to the distance $L_F$ and the distance $L_R$, as shown in FIGS. 4 and 5.

Fifth Embodiment

Figure 15:
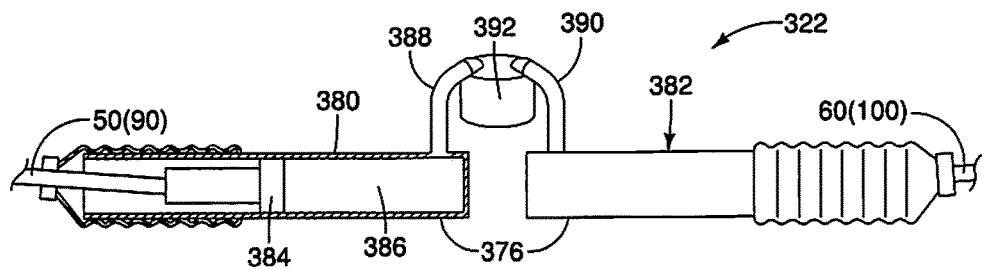
FIG. 15 is a cross-sectional view of a wheel steering mechanism having separate right and left wheel steering portions in accordance with a fifth embodiment.

Referring now to FIG. 15, a wheel steering mechanism 322 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

The wheel steering mechanism 322 can replace one or both of the front wheel steering mechanism 16 and/or the rear wheel steering mechanism 22 of the first embodiment. The wheel steering mechanism 322 includes a right wheel steering portion 380 and a left wheel steering portion 382 that are identical, and are spaced apart from one another. Since the right wheel steering portion 380 and the left wheel steering portion 382 are identical, description of one applies equally to both.

The right wheel steering portion 380 includes a housing 376 with a driven member 384 and hydraulic chamber 386. The driven member 384 is located within the hydraulic chamber 386 and is configured to be positioned by increases and decreases in the amount of hydraulic fluid within the hydraulic chamber 386. Hydraulic hoses 388 and 390 connect the hydraulic chamber 386 of the right wheel steering portion 380 and a corresponding hydraulic chamber (not shown) of the left wheel steering portion 382 to a hydraulic pump 392. The hydraulic pump 392 can increase or decrease the volume of hydraulic fluid in the hydraulic chambers of the right wheel steering portion 380 and the left wheel steering portion 382, thereby positioning the driven members 384 with great precision. By positioning the driven members 384, it is possible for the controller 28 to adjust the distances corresponding to the distance $L_F$ and the distance $L_R$, as shown in FIGS. 4 and 5.

Sixth Embodiment

Figure 16:
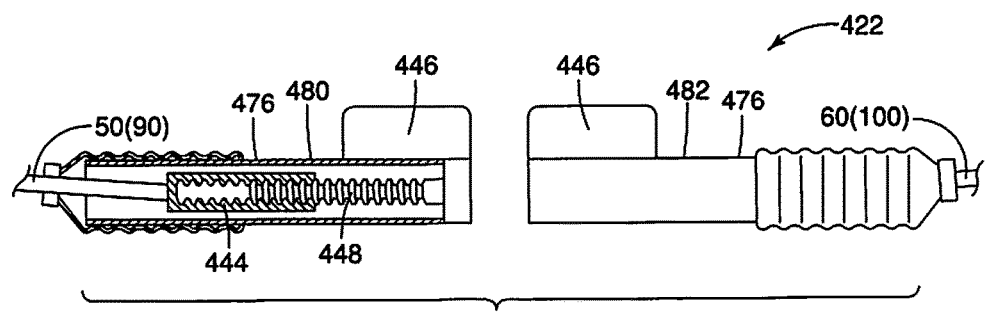
FIG. 16 is a cross-sectional view of a wheel steering mechanism having separate right and left wheel steering portions in accordance with a sixth embodiment.

Referring now to FIG. 16, a wheel steering mechanism 422 in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

The wheel steering mechanism 422 can replace one or both of the front wheel steering mechanism 16 and/or the rear wheel steering mechanism 22 of the first embodiment. The wheel steering mechanism 422 includes a right wheel steering portion 480 and a left wheel steering portion 482 that are identical, separate and spaced apart from one another. Since the right wheel steering portion 480 and the left wheel steering portion 482 are identical, description of one applies equally to both.

The right wheel steering portion 480 includes a housing 476 with a driven member 444, motor 446 and gear 448. The interior of the driven member 484 has internal spiral gear teeth that engage external spiral gear teeth on the gear 448. The motor 446 includes a gear that contacts the gear 448 and precisely rotates the gear 448. In the right wheel steering portion 480 the driven member 444 is connected to the tie rod 50 (or the tie rod 90) and the left wheel steering portion 480 is connected to the tie rod 60 (or the tie rod 100). The controller 28 is connected to the motors 446 of the wheel steering mechanism 222. The motors 446 are precision movement motors, such as stepper motors that include feedback circuits that provide the controller 28 with consistent positioning data that is used by the controller 28 to adjust the distances corresponding to the distance $L_F$ and the distance $L_R$, as shown in FIGS. 4 and 5.

Seventh Embodiment

Figure 17:
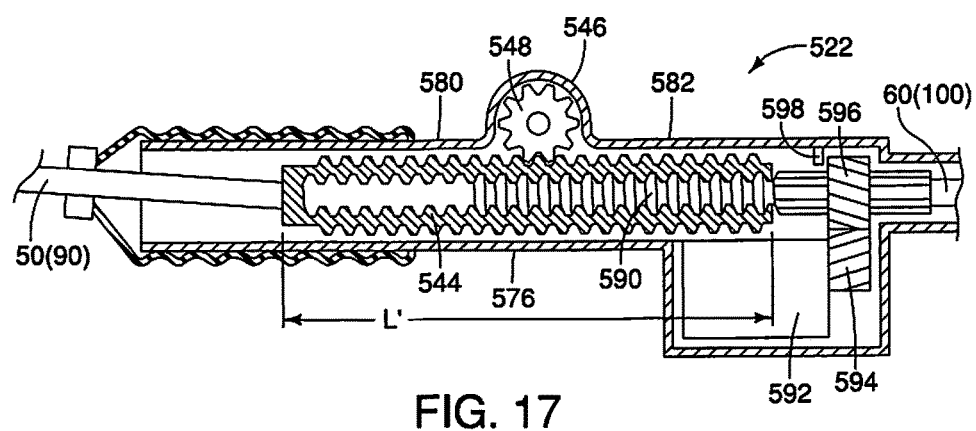
FIG. 17 is a cross-sectional view of a wheel steering in accordance with a seventh embodiment.

Referring now to FIG. 17, a wheel steering mechanism 522 in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

In the seventh embodiment, the wheel steering mechanism 522 can replace one or both of the front wheel steering mechanism 16 and the rear wheel steering mechanism 22 of the first embodiment in the vehicle 10. The wheel steering mechanism 522 includes a driven member 544 (a rack of a rack and pinion arrangement), a first electric motor 546 having a gear 548 (a pinion gear of the rack and pinion arrangement). The driven member 544 and the gear 548 are disposed within a housing 576. The driven member 544 has one end connected to the tie rod 50 (when used in the rear of the vehicle 10, the driven member 544 is attached to the tie rod 90) and a hollow interior provided with machined threads that engage mating machined threads of a second driven member 590. The second driven member 590 is connected to the tie rod 60 (when used in the rear of the vehicle 10, the second driven member 590 is attached to the tie rod 100). During steering and turning operations, the first electric motor 546 is operated by the controller 28 to move the driven member 544 and the second driven member 590 together as a single element to effect steering movements to their corresponding steerable wheels.

The wheel steering mechanism 522 is also provided with a second electric motor 592 controlled by the controller 28 to adjust the overall length L' of the rack defined by the driven member 544 and the second driven member 590. Changes in the overall length L' of the rack defined by the driven member 544 and the second driven member 590 correspond to adjustments in the toe angle between respective pairs of the steerable wheels. In other words, operation of the second electric motor 592 provides the effect of adjusting an equivalent of the distance $L_F$, as shown in FIG. 4 or the distance $L_R$ in FIG. 5.

The second electric motor 592 includes a gear 594 that engages another gear 596. The gear 596 is retained in position within the housing 576 by gear guides 598. The second driven member 590 has outer splines 590a that engage inner splines (not shown) within the gear 596. Hence, the second driven member 590 can be rotated by the gear 594 (rotated by the second electric motor 592), which rotates the gear 596. The gear 596 and the second driven member 590 rotate together as a single unit. The second driven member 590 can slide along an axis defined by the second driven member 590 (the axis also defined by the gear 596) during steering and turning operations. However, when the second electric motor 592 rotates the gear 594 and the second driven member 590, the thread engagement between the driven member 544 and the second driven member 590 causes the overall length L' to increase or decrease, depending upon the direction of rotation of the second electric motor 592.

The controller 28 preferably includes a microcomputer with a steering control program that controls the adaptive steering control apparatus 12. The controller 28 can also include other conventional components such as an input interface circuit, an output interface circuit, and storage devices such as a ROM (Read Only Memory) device and a RAM (Random Access Memory) device. The microcomputer of the controller 28 is programmed to control the adaptive steering control apparatus 12. The memory circuit stores processing results and control programs such as ones for operation of the adaptive steering control apparatus 12 that are run by the processor circuit. The controller 28 is operatively coupled to the adaptive steering control apparatus 12 in a conventional manner, including being directly wired to all the sensors and components, but can also include wireless communication where appropriate and practical. The internal RAM of the controller 28 stores statuses of operational flags and various control data. The internal ROM of the controller 28 stores data and instructions for operating the various components of the adaptive steering control apparatus 12 for various operations. The controller 28 is capable of selectively controlling any of the components of the adaptive steering control apparatus 12 in accordance with the control program. It will be apparent to those skilled in the art from this disclosure that the precise structure and algorithms for the controller 28 can be any combination of hardware and software that will carry out the functions of the present invention.

The various vehicle features and structures are conventional components that are well known in the art. Since vehicle features and structures are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the adaptive steering control apparatus. Accordingly, these terms, as utilized to describe the present invention should be interpreted relative to a vehicle equipped with the adaptive steering control apparatus.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle adaptive steering control apparatus, comprising:
   a steer-by-wire steering wheel assembly;
   a front wheel steering mechanism in electronic communication with the steer-by-wire steering wheel assembly, the front wheel steering mechanism having a right wheel steering portion and a left wheel steering portion;
   a left front wheel rotatably coupled to the left wheel steering portion;
   a right front wheel rotatably coupled to the right wheel steering portion; and a controller in electronic communication with the steer-by-wire steering wheel assembly and the front wheel steering mechanism, the controller being configured to operate the front wheel steering mechanism to turn the left front wheel and the right front wheel in accordance with Ackerman steering geometry, the controller also being configured to calculate toe angle adjustments for the right wheel steering portion relative to the left wheel steering portion and make the toe angle adjustments to right wheel steering portion and the left wheel steering portion during turning and steering movements effected by the right wheel steering portion and the left wheel steering portion, wherein the right wheel steering portion includes a first driven member and a right side electric motor with a driving gear engaged with the first driven member such that operation of the right side electric motor moves the first driven member, the left wheel steering portion includes a second driven member and a left side electric motor with a driving gear engaged with the second driven member such that operation of the left side electric motor moves the second driven member, the front wheel steering mechanism includes a first housing and a second housing separated from one another, the first housing having the first driven member disposed therein and the second housing having the second driven member disposed therein, the first driven member includes a hollow interior with internal spiral machine threads formed therein, and the driving gear of the first electric motor includes external spiral machine threads engaged with the internal spiral machine thread within the first driven member.

2. A vehicle adaptive steering control apparatus comprising:

a steer-by-wire steering wheel assembly;

a front wheel steering mechanism in electronic communication with the steer-by-wire steering wheel assembly, the front wheel steering mechanism having a right wheel steering portion and a left wheel steering portion;

a left front wheel rotatably coupled to the left wheel steering portion;

a right front wheel rotatably coupled to the right wheel steering portion; and a controller in electronic communication with the steer-by-wire steering wheel assembly and the front wheel steering mechanism, the controller being configured to operate the front wheel steering mechanism to turn the left front wheel and the right front wheel in accordance with Ackerman steering geometry, the controller also being configured to calculate toe angle adjustments for the right wheel steering portion relative to the left wheel steering portion and make the toe angle adjustments to right wheel steering portion and the left wheel steering portion during turning and steering movements effected by the right wheel steering portion and the left wheel steering portion, wherein the front wheel steering mechanism includes a single housing, the right wheel steering portion includes a first driven member movably disposed within the single housing, the first driven member having external gear teeth and a hollow interior with internal spiral machine threads, and the left wheel steering portion includes a second driven member movably disposed within the single housing, the second driven member having external spiral machine threads engaged with the internal spiral machine thread within the first driven member.

3. The vehicle adaptive steering control apparatus according to claim 2, further comprising a first electric motor having a first driving gear engaged with the external gear teeth of the first driven member; and a second electric motor having a second driving gear contacting a sliding gear disposed on a portion of the second driven member, wherein the controller is configured to operate the first electric motor in order to effect steering and turning operations, and the controller is configured to operate the second electric motor in order to make toe angle adjustments.

* * * * *